United States Patent
Mooradian et al.

(10) Patent No.: US 8,184,175 B2
(45) Date of Patent: May 22, 2012

(54) SYSTEM AND METHOD FOR DETECTING A CAMERA

(75) Inventors: Gregory Mooradian, San Diego, CA (US); Sam Rindskopf, San Diego, CA (US); Tudor Thomas, San Diego, CA (US); Brian Yates, San Diego, CA (US); Adam Petersen, San Diego, CA (US); Michael Mooradian, San Diego, CA (US)

(73) Assignee: FPSI, Inc., San Francisco, CA (US)

( * ) Notice: Subject to any disclaimer, the term of this patent is extended or adjusted under 35 U.S.C. 154(b) by 207 days.

(21) Appl. No.: 12/545,504

(22) Filed: Aug. 21, 2009

(65) Prior Publication Data

US 2010/0053359 A1    Mar. 4, 2010

Related U.S. Application Data

(60) Provisional application No. 61/091,955, filed on Aug. 26, 2008, provisional application No. 61/176,700, filed on May 8, 2009.

(51) Int. Cl.
*H04N 5/228* (2006.01)
(52) U.S. Cl. .................................. 348/222.1; 385/104
(58) Field of Classification Search ............... 348/222.1
See application file for complete search history.

(56) References Cited

U.S. PATENT DOCUMENTS

| | | | |
|---|---|---|---|
| 6,018,374 A | 1/2000 | Wrobleski | |
| 6,134,013 A * | 10/2000 | Sirat et al. | 356/602 |
| 6,603,134 B1 | 8/2003 | Wild et al. | |
| 6,665,079 B1 * | 12/2003 | Tocci et al. | 356/614 |
| 6,704,447 B2 * | 3/2004 | Sukthankar et al. | 382/170 |
| 6,801,642 B2 | 10/2004 | Gorday et al. | |
| 6,827,454 B2 * | 12/2004 | Kimura et al. | 353/122 |
| 6,977,366 B2 * | 12/2005 | Light et al. | 250/221 |
| 7,006,630 B2 * | 2/2006 | Yu et al. | 380/201 |
| 8,045,760 B2 * | 10/2011 | Stam et al. | 382/104 |

(Continued)

FOREIGN PATENT DOCUMENTS

JP    2001313006 A    9/2001

OTHER PUBLICATIONS

"Preventing Camera Recording by Designing a Capture-Resistant Environment," by Khai N. Truong, Shwetak N. Patel, Jay W. Summet, and Gregory D. Abowd, Ubicomp 2005, pp. 73-86, Tokyo Japan, Sep. 2005. Downloaded from http://www.cc.gatech.edu/~summetj/cre/index.html on Apr. 30, 2009.

(Continued)

*Primary Examiner* — Jason Chan
*Assistant Examiner* — Cynthia Calderon
(74) *Attorney, Agent, or Firm* — Burn & Levinson, LLP; Jacob N. Erlich, Esq.

(57) ABSTRACT

A system and method for detecting a camera. In one embodiment, although not limited thereto, an illuminator illuminates an area of interest. A camera then takes multiple pictures of the illuminated area and an algorithm is then used to compare the pictures and locate and pirate cameras based on the reflection characteristics.

16 Claims, 15 Drawing Sheets

U.S. PATENT DOCUMENTS

| | | | |
|---|---|---|---|
| 2002/0171813 A1 | 11/2002 | Kimura et al. | |
| 2004/0061676 A1 | 4/2004 | Sitrick et al. | |
| 2004/0202382 A1 | 10/2004 | Pilu | |
| 2004/0247120 A1 | 12/2004 | Yu et al. | |
| 2004/0252835 A1 | 12/2004 | Odgers | |
| 2005/0029456 A1 | 2/2005 | Eggers et al. | |
| 2006/0228003 A1* | 10/2006 | Silverstein | 382/115 |
| 2007/0103552 A1* | 5/2007 | Patel et al. | 348/203 |
| 2008/0031596 A1 | 2/2008 | Balogh | |
| 2008/0193014 A1* | 8/2008 | Ecker et al. | 382/173 |
| 2010/0097312 A1* | 4/2010 | Destura et al. | 345/156 |

OTHER PUBLICATIONS

Thresholding Using the ISODATA Clustering Algorithm, IEEE Transactions on Systems, Man and Cybernetics, vol. 10, Issue 11, Date: Nov. 1980, pp. 771-774.

Handbook of Pattern Recognition and Image Processing, T.Y. Young and K.S. Fu, Chapter 2, pp. 33-57, 1986, ISBN 0-12-774560-2.

International Search Report dated Apr. 20, 2010 for PCT/US09/54860. Applicant: Apogen Technologies, Inc.

Written Opinion dated Apr. 20, 2010 for PCT/US09/54860. Applicant: Apogen Technologies, Inc.

\* cited by examiner

SYSTEM AND METHOD FOR DETECTING A CAMERA

This application claims the priority date of Provisional Application Ser. No. 61/091,955, entitled SYSTEM AND METHOD FOR DETECTING A CAMERA, filed on Aug. 26, 2008, and Provisional Application Ser. No. 61/176,700, entitled SYSTEM AND METHOD FOR DETECTING A CAMERA, filed on May 8, 2009, which this application incorporates by reference in their entirety.

BACKGROUND

Many people have the need or desire for privacy. With the advance of technology related to photographic and video recording equipment has come widespread use. In fact, many cell phones now have cameras as standard equipment. Such accessibility to recording equipment enables users to easily and surreptitiously record images of people and their private property.

Motion pictures are generally first released in movie theaters before being made available on consumer media. This limited monopoly insures revenue so that production companies can recoup the costs of production. There have been numerous incidents in which movies have been pirated during screenings in theaters and then released on the black market. Movies are sometimes pirated by smuggling video cameras into a theater and filming the showing. The pirated video may then be copied and distributed illegally to consumers. Movie pirating is a major problem that is estimated to be costing the movie industry billions of dollars a year in lost profits.

A need exists in the motion picture industry as well as many others to address problems associated with the unauthorized use of cameras, video recorders, or other optical devices. Therefore, it would be beneficial to have a superior system and method for detecting optical devices.

SUMMARY

The needs set forth herein as well as further and other needs and advantages are addressed by the present embodiments, which illustrate solutions and advantages described below.

The method of the present embodiment includes, but is not limited to: acquiring a first image of a target area on the same axis as an illumination source; acquiring a second image of the target area on a different axis from the illumination source; and identifying retro-reflections in the target area by analyzing the first image and the second image by: filtering the first image; creating an image mask using the second image; applying the image mask to the first image; and separating features in the foreground in the first image larger than a predetermined size.

The system of the present embodiment includes, but is not limited to: an illumination system for illuminating a target area; an image acquisition system for capturing a first image of the target area on the same axis as the illumination system and for capturing a second image of the target area on a different axis from the illumination system; and a processor and computer readable media having computer code for causing a processor to identify retro-reflections in the target area by analyzing the first image and the second image.

Other embodiments of the system and method are described in detail below and are also part of the present teachings.

For a better understanding of the present embodiments, together with other and further aspects thereof, reference is made to the accompanying drawings and detailed description, and its scope will be pointed out in the appended claims.

DETAILED DESCRIPTION

Figure 1:
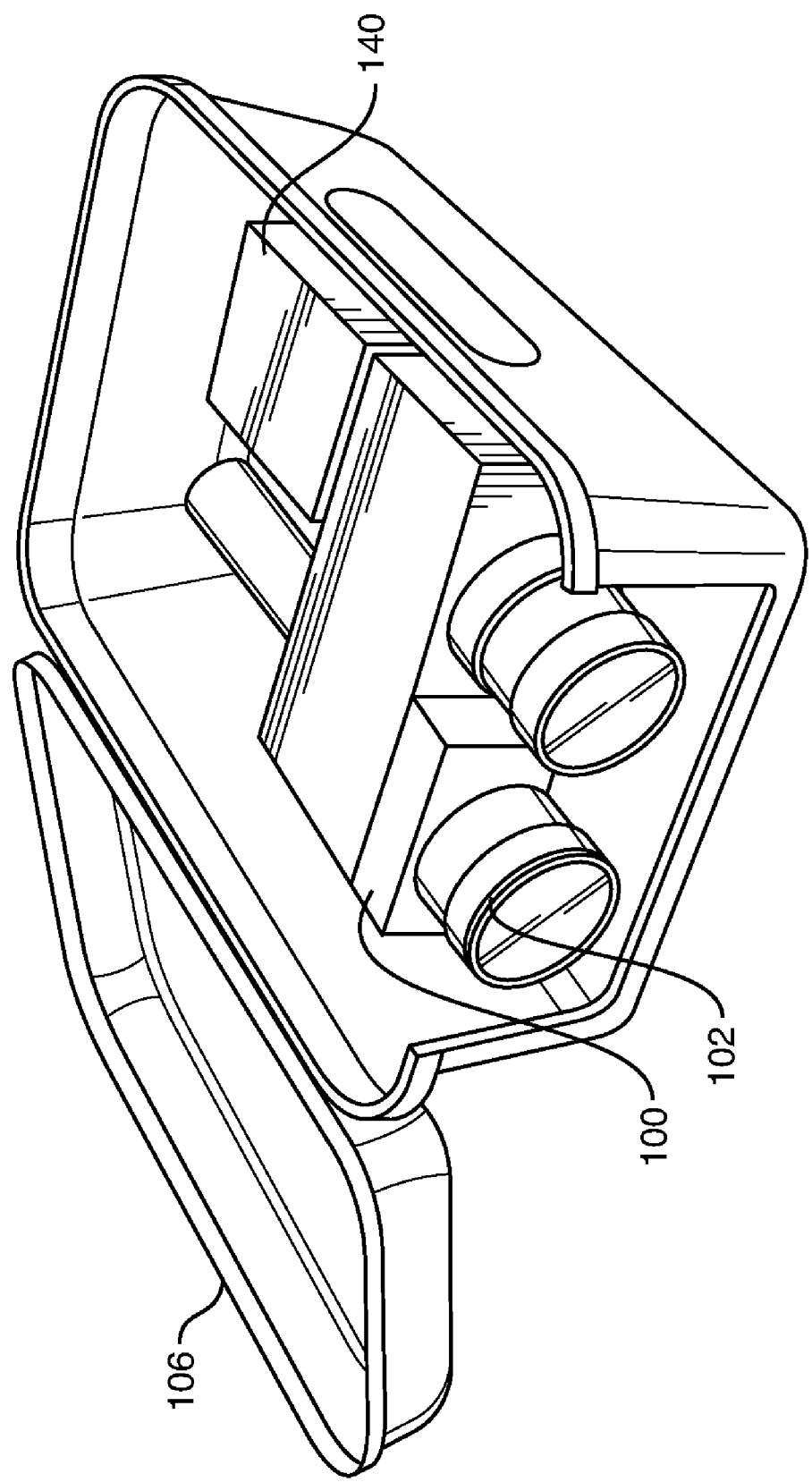
FIG. 1 is a pictorial view of one embodiment of the system in a carrying case.

The present teachings are described more fully hereinafter with reference to the accompanying drawings, in which the present embodiments are shown. The following description is presented for illustrative purposes only and the present teachings should not be limited to these embodiments.

The present teachings relate to the field of optical detection systems and methods and, more particularly, to a system and method for detecting hidden optical devices such as, although not limited thereto, cameras and video recorders. Disclosed herein are methods of and systems for locating the surreptitious use of "pirate" cameras in areas such as theaters, although not limited thereto. In fact, any place where one desires to prevent the use of cameras, video equipment, or other optical instruments may be a suitable use for this system. Examples include, although not limited thereto, sporting events, dramatic theater, political events, private functions, art galleries, trade shows, research laboratories, manufacturing facilities, bathrooms, hotel rooms, meetings, protection from snipers, etc.

Camera phones and other related consumer technology have made it much easier to take still photographs and video anywhere, creating a legitimate concern among those who wish to retain some level of privacy or secrecy. Companies are concerned about these devices since they compromise the security of their intellectual property, providing an easy way to steal ideas and proprietary information. But banning or confiscating such equipment is difficult and increasingly inappropriate given such widespread adoption and reliance on them.

In one embodiment, the system comprises an image capturing system (also referred to as a camera) and an illuminator, although not limited thereto. In this embodiment, an area of interest may be illuminated with light by the illuminator and images of the area of interest may be taken with the camera at different exposure levels. Images of pirate cameras exhibit unique characteristics at different exposure levels because the light from the illuminator is reflected by their optical lenses. Comparing the images with the help of an algorithm, which may be implemented in software or hardware, although not limited thereto, helps to identify and locate a pirate camera.

Detection of optical equipment using retro-reflection, sometimes called the "cat's eye" response, occurs whenever light entering the lens of an optical system is focused onto and reflected back from the focal plane of a lens system. The "lens system" can be, although not limited thereto, that of a camera, telescope, scope optics or the lens of an eye. The focal plane can be, although not limited thereto, a film plane, an electronic imaging device such as a charge-coupled device (CCD), or the retina of the eye. The amount of reflectivity at the focal plane can be very low and still produce detectable retro signals because the "gain" from the collection area of the lens system usually is quite large.

The retro-reflection signal from optical equipment is along the same line-of-sight (LOS) as the interrogation beam of the illuminator (on-axis), but other sources of light in the vicinity of the target may produce a response as well, e.g., glare sources. These other random sources are "clutter" (also referred to as "glint"), and while detection without clutter rejection is possible, it often results in too many false positives.

The system is discussed below in terms of pirate cameras, but the system and method of use are not limited to these particular devices. In fact, any type of optical equipment may be identified with the system disclosed herein and whenever it would be beneficial to identify such optical equipment is a potential application for the system and method of use.

Referring now to FIG. 1, shown is a pictorial view of one embodiment of the system in a carrying case 106. The system may comprise an off-axis illuminator 104, a camera 100 and a filter 102, although not limited to this embodiment. The off-axis illuminator 104 illuminates the target area in a specific band of light. In this embodiment, the off-axis illuminator 104 may be close enough to the camera 100 that it is within the angle of incidence of any reflected light. Consequently, the off-axis illuminator 104 is able to generate retro-reflection from any optical devices in the target area. In one embodiment, although not limited thereto, an infrared (IR) illuminator may be used. Other forms of light may also be used and the present teachings are not limited to this particular type of light. The IR illuminator may operate in the near IR band with a center wavelength with a range of approximately between 700 nm and 1600 nm and a bandwidth around approximately 100 nm, although not limited to these particular ranges. Other types of light in various bandwidths may be more appropriate under difference circumstances and are discussed further below. For example, although not limited thereto, a laser may be used instead. The off-axis illuminator 104 provides light to the target area which will be reflected by certain objects such as optical equipment, which helps to identify the use of pirate cameras.

The system may also include a camera 100, which may be a charge-coupled device (CCD) digital camera, although not limited to this embodiment. For example, although not limited thereto, camera technologies such as CMOS or film may also be used. The camera 100 may be able to detect the wavelength emitted by the off-axis illuminator 104 and record images that may be manipulated digitally. Additionally, the camera 100 may include means for manipulating exposure by aperture, exposure time or otherwise, although not limited to this embodiment.

The camera 100 may include a filter 102 that accepts the wavelengths of light provided by the off-axis illuminator 104 while rejecting all other wavelengths, although not limited to this embodiment. This is helpful to identify true retro-reflections of the light from the off-axis illuminator 104. For example, although not limited thereto, if the off-axis illuminator 104 emits invisible IR light, the filter 102 will help to isolate the reflected IR light from visible light, assisting in identifying reflections.

The system may be constructed into a single kit which may be portable or they may be installed separately at a location in a permanent or semi-permanent fashion, although not limited to this embodiment. A carrying case 106 may contain the camera 100, off-axis illuminator 104 and filter 102, so that the system may be easily transported and brought to a temporary location such as an art gallery, although not limited to this embodiment. In the alternative, a more permanent location such as a movie theater may choose to incorporate the system into the stage or screen to assure a clear view of the gallery, although not limited to this embodiment.

In operation, a large target area, such as a theater, although not limited thereto, may be illuminated in sections by the off-axis illuminator 104. The camera 100 may then capture multiple exposures of the illumination area, such as a short exposure image and a long exposure image, although not limited thereto. The amount of exposure may be controlled by changing the exposure time or other means, such as by changing the aperture size, and the system is not limited to this embodiment. Multiple images provide a more reliable method of detection of any pirate cameras.

The short exposure image exposure time may be set to obtain the following image, although not limited to this embodiment:

1. There appears a local maximum, e.g., a well-defined peak of bright pixels representing the reflected light surrounded by darker pixels, roughly in the middle of the pirate camera lens, although not limited to this embodiment. This local maximum is referred to as the "pirate camera reflection;"

2. The intensity of the image of the pirate camera lens is near the detection camera's maximum possible intensity; and 3. Most other objects in the area of interest do not appear or are faint.

The long exposure image exposure time may be set to obtain the following image, although not limited to this embodiment:

1. The image of the pirate camera lens still appears as a local maximum, e.g., a well defined peak of bright pixels surrounded by darker pixels; and 2. Images of other objects are bright, even perhaps overexposed.

The current exposure times for the short and long exposures are approximately 80 ms and approximately 750 ms, respectively, although not limited to these particular ranges. The exact exposure times depend on a number of settings/factors such as lens size, aperture size and camera sensitivity. It may be advantageous to keep the camera 100 relatively still between the exposures so that everything that is not moving in the illuminated area appears in substantially the same place in each image, although not limited to this embodiment.

The output of the camera 100 may be coupled to a processor and storage device (neither shown in FIG. 1) such as a personal computer, which may be programmed according to the present system, although not limited to this embodiment. The coupling may be by physical connection to a proximate processor, or the camera 100 output may connect to the processor wirelessly, although not limited to this embodiment. The processor may contain software or have configured hardware in order to manipulate the images on the storage device, although not limited to this embodiment.

The processor may manipulate the captured short and long exposure images according to the following algorithm, although not limited to this embodiment:

1. For each image:
   a. Find local maxima; and
   b. Select maxima below a given size to find positives;
2. Choose only positives, discussed further below, that are in both images. In this way the processor may determine the presence and location of any pirate cameras in the images taken by the camera 100 since the positives that are in both images are pirate cameras.

The positives in the images are a result of light from the off-axis illuminator 104 reflected by the pirate camera lens. The positives (or reflected light) may have the following characteristics, although not limited to this embodiment:

1. It is a strong signal that is brighter than most objects. For example, although not limited thereto, in a darkened theater setting the reflected light will be easy to identify;
2. The signal is a local maximum for a wide range of exposure levels;
3. The signal maintains roughly the same size across a wide range of exposure levels, while other image objects change apparent size as they are illuminated, saturating and 'bleeding' into other objects; and
4. It does not move while images of it are acquired.

These characteristics make it possible to discriminate between light reflected from pirate cameras and light reflected from other objects.

The unique reflected signal characteristic of pirate cameras may be due the following, although not limited to this embodiment:

1. Reflection off pirate camera lenses;
2. Spoiled retro-reflection. Off-axis illuminator 104 light bounces off of a pirate camera's internal filter and returns to the detection camera 100. Since the pirate camera's internal filter is close to (but not right at) the focal point of its lensing system, the retro-reflection returns to the source, but at a slightly broader angle than it would with a pure retro-reflection; or
3. A combination of the above two signals.

In this embodiment, the off-axis illuminator 104 is close enough to the camera 100 that it is within the angle of incidence of any reflected light. Consequently, the off-axis illuminator is able to generate retro-reflection from any optical devices in the target area. The high-exposure (e.g., 750 ms, etc.) image will include reflections from all background clutter. The low-exposure (e.g., 80 ms, etc.) image will include just the retro-reflections of optical devices. So optical devices may be identified by their presence in both images.

Figure 2:
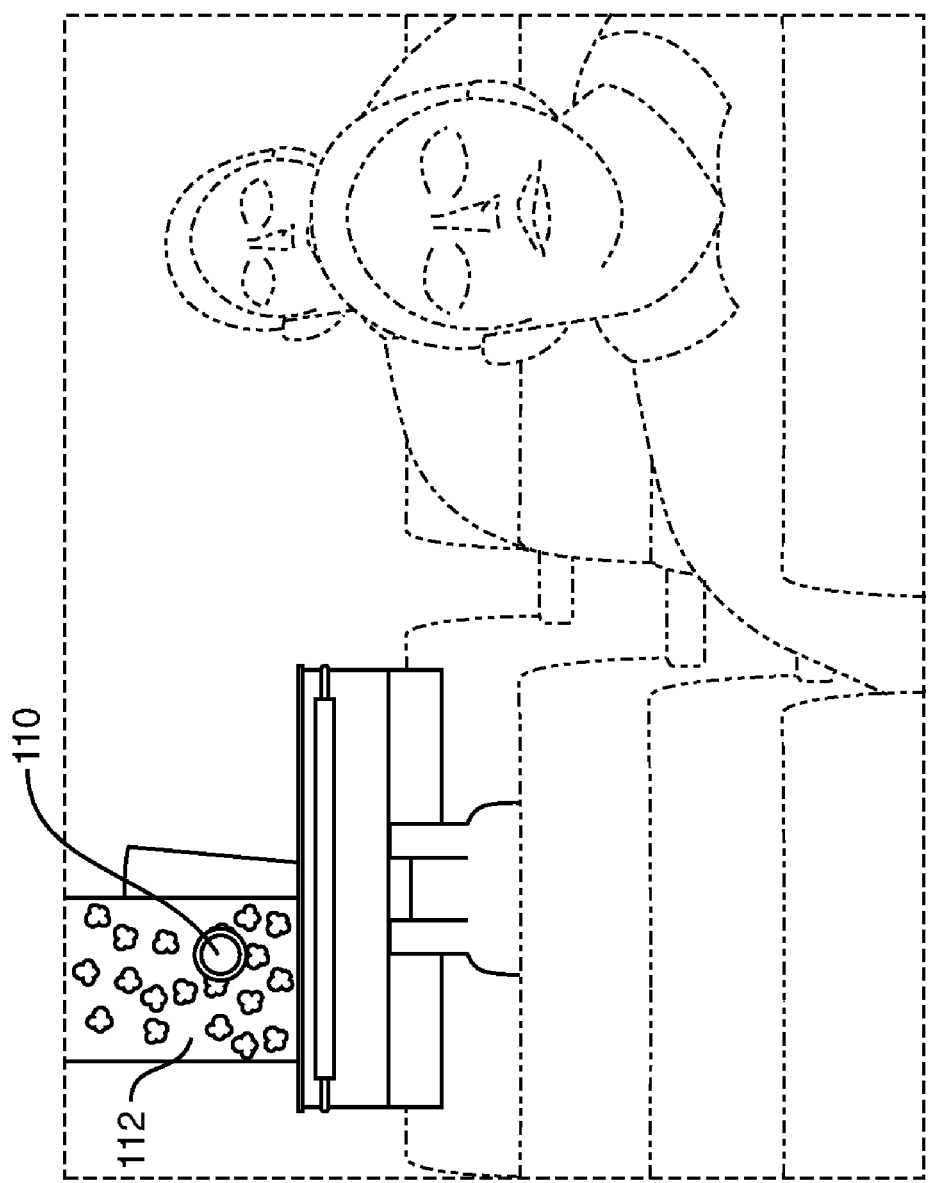
FIG. 2 is a pictorial view of a hidden pirate camera being used in a movie theater.

Referring now to FIG. 2, shown is a pictorial view of a hidden pirate camera being used in a movie theater. Pirate cameras 110 are known to have been smuggled into movie theaters and hidden in many different ways. For example, a pirate camera 110 may be hidden in a popcorn box 112. The pirate camera 110 may be smuggled into the movie theater and positioned in such a way that it has a clear view of the screen. The pirate camera 110 may record the entire motion picture and then be duplicated and sold on the black market. The system disclosed herein is able to identify a pirate camera 110 no matter how it is hidden since its lens will be directed toward the screen in order to record the movie. By positioning the present system at the screen facing outwards, any pirate camera 110 may be detected by light reflecting off of its lens.

Figure 3A:
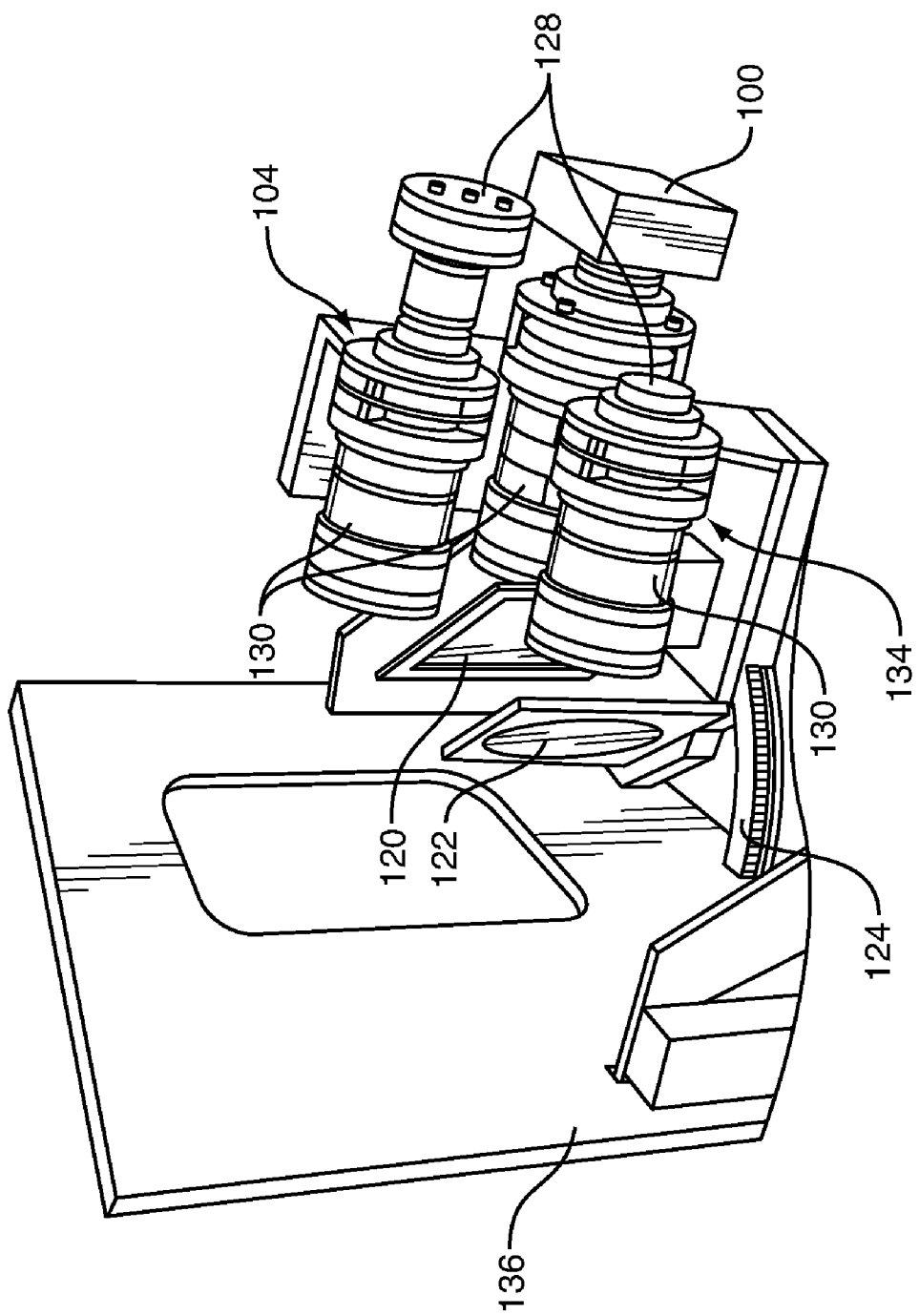
FIG. 3A is a pictorial view of a further embodiment of the system using three lenses.

Referring now to FIG. 3A, shown is a pictorial view of a further embodiment of the system using three lenses. The system may have multiple lenses 130, each with a specific purpose. For example, although not limited thereto, the system may have: an off-axis illuminator 104; a camera 100 (or detector lens); and an on-axis illuminator 134, each having lenses operationally connected. For example, although not limited thereto, each lens may be a zoom lens, a wide-angle lens, or some other type of lens appropriate for the system.

The illumination light sources for the off-axis illuminator 104 and on-axis illuminator 134 may be LEDs 128 (light-emitting-diodes), although many other wavelengths of light are appropriate and the system is not limited to this particular embodiment. LEDs may be utilized because a pirate camera may employ an IR filter to block any retro-reflection from an IR illuminator. The system may also incorporate a beam splitter 120 and mirror 122, although not limited to this embodiment, in order to provide for the on-axis illuminator 134. The mirror 122 may reflect the light from the on-axis illuminator 134 to the beam splitter 120, which in turn reflects the light to the target area along the axis of the camera 100 (on-axis). While the beam splitter 120 reflects the light from the on-axis illuminator 134 to the target area, it may still allow any light reflected from the target area to pass through to the camera 100. On-axis illumination is helpful to find true retro-reflection from pirate cameras.

The off-axis illuminator 104 may then be used as a discriminator against false positives by the on-axis illuminator 134. When the system detects a pirate camera (or other optical device in the target area) by light reflected from the on-axis illuminator 134, it may activate the off-axis illuminator 104 to get reflected light from a different angle. A comparison of the reflections by the on-axis illuminator 134 and the off-axis illuminator 104 helps to minimize false positives. Optical equipment will only exhibit true retro-reflection, so if off-axis illumination of the same area also returns reflected light, it has to be background clutter and can not be a pirate camera. The system may do subsequent interrogations to confirm any detections, although not limited to this embodiment.

The system may be on a pan/tilt track 124, although not limited thereto, permitting the scanning of an area larger than the field of view of a fixed camera 100 lens. The system may scan the desired target area—for example, although not limited thereto, a theater audience—with a low level interrogation source several times during a movie. The ability to pan may keep the feature size to a reasonable geometry, permitting the use of a lens with a smaller pixel count and an illumination source that requires less power, although not limited to this embodiment. The pixel count is used to make detections by measuring the size of the reflected light. Pirate camera lenses, for example, may exhibit more reflection than background clutter due to the retro-reflection of the optical lens. The system could also be used without a pan/tilt track 124 with a lens having a larger pixel count and an illumination source with power capable of illuminating the entire target area.

The system may also incorporate forensic image acquisition, although not limited to this embodiment, and may take a forensic image of any people near a detected pirate camera. The system may do so by incorporating a capability to acquire and store images of the pirate camera and a nearby pirate camera operator in very low light levels, such as inside a theater, and transmit this image wirelessly to a system operator located elsewhere in the movie complex.

The system may wirelessly notify an official, such as an usher or security guards, of the presence of a pirate camera, although not limited to this embodiment. The system may do so by incorporating a method to send an alert of positive camera detection to email, cell phone via MMS technology, or a pager, although not limited to these embodiments. This alert may include a copy of the forensic image of the pirate camera and operator as well as their physical location within the target area (e.g., a theater, etc.), although not limited to this embodiment. In this way, an usher may immediately receive notification of the pirate camera detection and immediately find the pirate camera and operator with minimal interruption to the rest of the audience.

Control and monitoring of the system may be completely remote and in almost all cases such detection will be unknown to the operator of the pirate camera being interrogated. Features of the system may include active source control, high resolution imaging, remote zoom control, pre-programmed scan control, remote operation and image transmission, and low cost, although not limited to these embodiments.

Figure 3B:
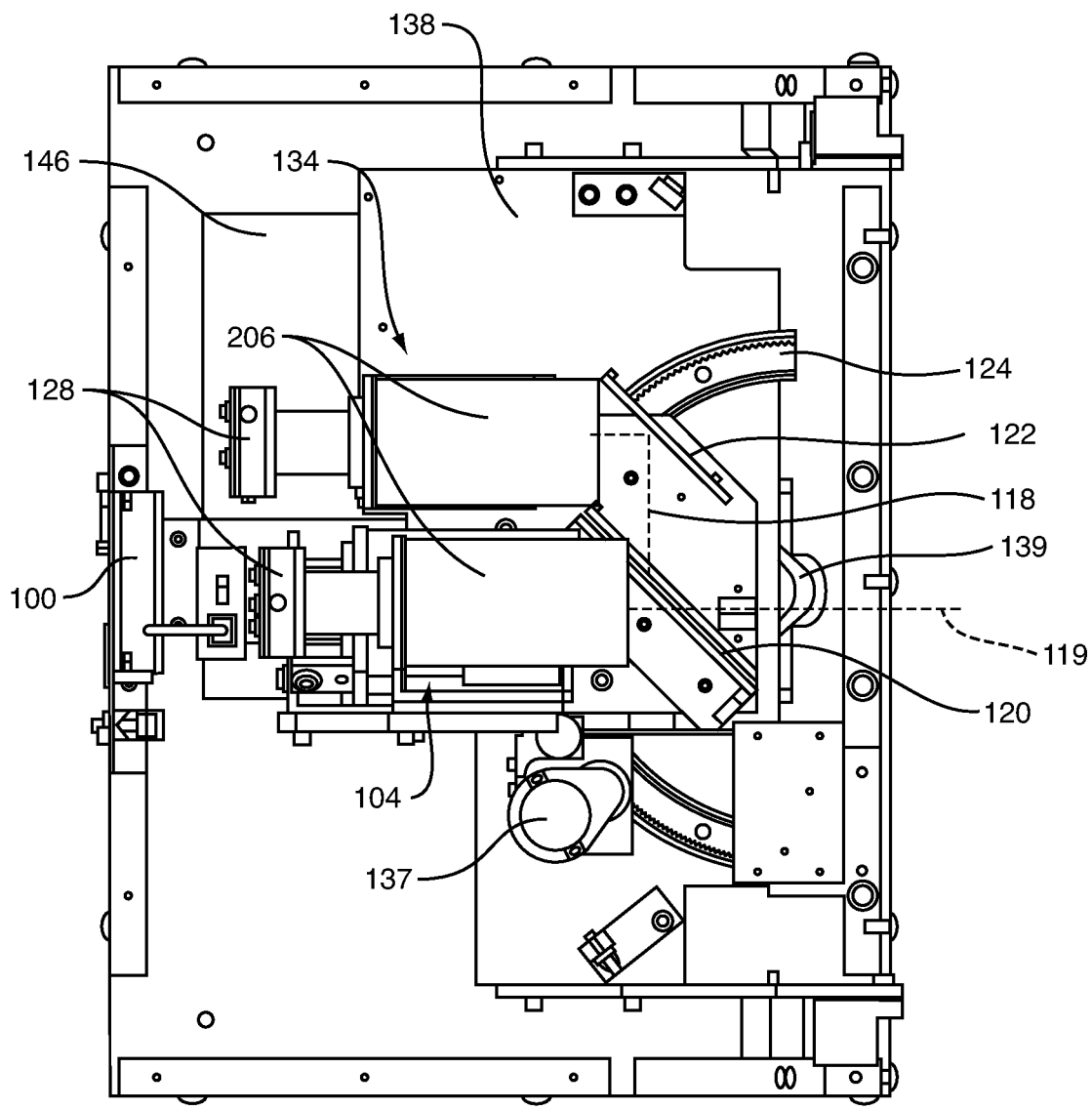
FIG. 3B is a schematic diagram of the embodiment depicted in FIG. 3A.

Referring now to FIG. 3B, shown is a schematic diagram of the embodiment depicted in FIG. 3A. The on-axis illuminator 134 may use a highly directional LED 128 for its illumination source, which projects light through a zoom lens 206 positioned by the controller board underneath the pan and tilt platform 138 to a fixed mirror 122. The light is then projected along the on-axis illumination light path 118 to the (dichroic) beam splitter 120 which projects the light along the axis of the camera 100 to the target area. Any reflection of the illumination light from objects in the target area is passed back through the beam splitter 120 and zoom lens 206 to the camera 100. Signals from the camera pixels illuminated by the reflection are provided to the Local PC 146 as images and then sent by the controller board to an antenna which sends the image to a Remote PC (not shown in FIG. 3B) controlled by a system operator. The image seen by the system operator could be either a retro-reflection from a pirate camera (or other optical device) in the target area if the path of the reflection is on the axis of camera 100, or it could be background glint (clutter) if the path of the reflection is omni-directional.

An off-axis illuminator 104 may be positioned above the camera 100 (as shown in FIG. 3A) and used to reduce false positives of detections by the on-axis illuminator 134. When the light is projected from an LED 128 through a zoom lens 206 along the off-axis illumination light path 119. Any reflection of the light from objects in the target area is passed back through the beam splitter 120 and zoom lens 206 to the camera 100. Signals from the camera pixels illuminated by the reflection are provided to the Local PC 146 as images and sent by the controller board to an antenna which sends the image to the Remote PC controlled by a system operator. In this case, the image seen by the system operator can only be background glint (clutter) as a retro-reflection from a pirate camera illuminated by light projected from the off-axis illuminator 104 cannot be reflected back to the camera 100. Accordingly, if the system operator gets a reflection when light is projected from the on-axis illuminator 134, but not when light is projected from the off-axis illuminator 104, pointed to the same location in the target area by the pan motor 137 and tilt motor 139 along the pan/tilt track 124 by the controller board, the reflection is a retro-reflection of a camera and not background glint. However, if the operator gets a reflection when both the on-axis illuminator 134 and off-axis illuminator 104 are pointed to the same location, the reflection is background glint.

One embodiment of the method for identifying optical equipment in the target area, although not limited thereto, includes the steps of: illuminating an area with a light source on a first axis; capturing a first image of the illuminated area; identifying a potential optical device by its reflection characteristics in the first image; illuminating the potential optical device with a light source on a second axis; capturing a second image of the potential optical device; and identifying an actual optical device by its reflection characteristics in the second image. The Local PC may automatically detect the retro-reflection of pirate cameras with the dual-axis illumination method and image processing algorithm (discussed further below) by employing software stored on computer readable media.

The Remote PC may also have computer instructions on computer readable media used to control the functions of the system. The Remote PC may have a graphical user interface (GUI) that permits a system operator, positioned remotely, although not limited thereto, to control the system functions via the Local PC, either wirelessly or otherwise. Each Remote PC may control a number of different Local PCs. For example, a movie theater complex may have 16 different screening rooms all employing the system and a single system operator may control and monitor them all from a single location. The GUI may have a map of the target area (e.g., theater) and communicate with the Local PC to identify the location of any pirate cameras and obtain forensic imaging of potential pirate camera operators. The Remote PC may monitor the system, accepts alerts, and store images provided by the Local PC, although not limited thereto. For example, the system operator may take control of the system through the GUI and pan/zoom the target area looking for a specific person, although not limited thereto. The Remote PC may also further analyze the images sent by the Local PC.

Figure 4:
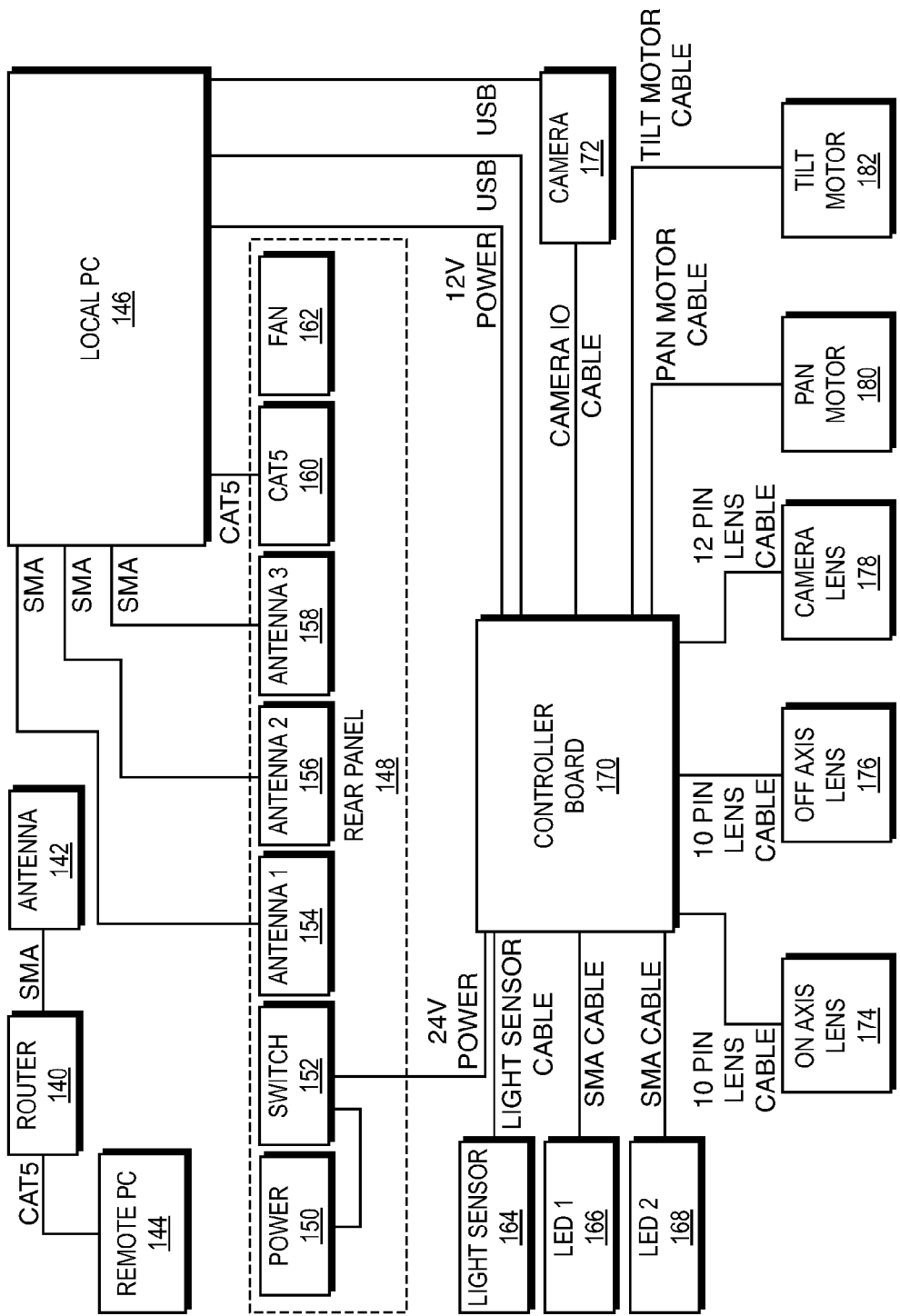
FIG. 4 is a block diagram describing the functional layout of the embodiment depicted in FIGS. 3A and 3B.

Referring now to FIG. 4, shown is a block diagram describing the functional layout of the embodiment depicted in FIGS. 3A and 3B. The system may have a Remote PC 144 which acts as the master controller for all detectors (e.g., one Remote PC 144 could control several Local PCs), although not limited to this embodiment. The Local PC 146 may handle all functions of a local detector from image processing to motion control to illumination control, although not limited to this embodiment. The camera 172 may detect pirate cameras and also be used for real time situational awareness, although not limited to this embodiment. The controller board 170 may handle illuminators (e.g., on-axis lens 174 and off-axis lens 176, etc.), light sensor 164, pan motor 180 and tilt motor 182, all lenses, and communicates with the Local PC 146, although not limited to this embodiment. The light sensor 164 may keep track of the general illumination level of the target area to optimize accuracy, although not limited to this embodiment.

Two LEDs (e.g., on-axis lens 174 and off-axis lens 176, etc.) may act as the main illuminators for detection and discrimination, although not limited to this embodiment. Both on-axis or off-axis light may be controlled with scanning mirrors. The system may incorporate non-sequential scanning, although not limited to this embodiment. The system may do so by incorporating a capability to randomly scan an entire movie theater several times during the showing of a movie. This minimizes the perception of the LED flash utilized by the device to detect camcorders.

The system may also incorporate countermeasures mitigation, although not limited to this embodiment. The system may do so by incorporating image processing algorithms which provide the capability to be able to detect a retro reflection from a camcorder equipped with countermeasures such as circular polarizer filters, intended to defeat the pirate camera detection system. In this way, the user of a pirate camera will be unable to avoid detection.

The system may also incorporate short pulse interrogation, although not limited to this embodiment. The system may do so by incorporating high powered LEDs that possess the capability to be pulsed at very short (e.g., sub-millisecond) durations to detect camcorders illegally in operation inside a movie theater. The QinetiQ-NA developed drivers possess the capability to be pulsed at sub-millisecond pulse durations with a high degree of accuracy. These durations may be preferable to minimize the perceptibility by the theater audience.

Figure 5:
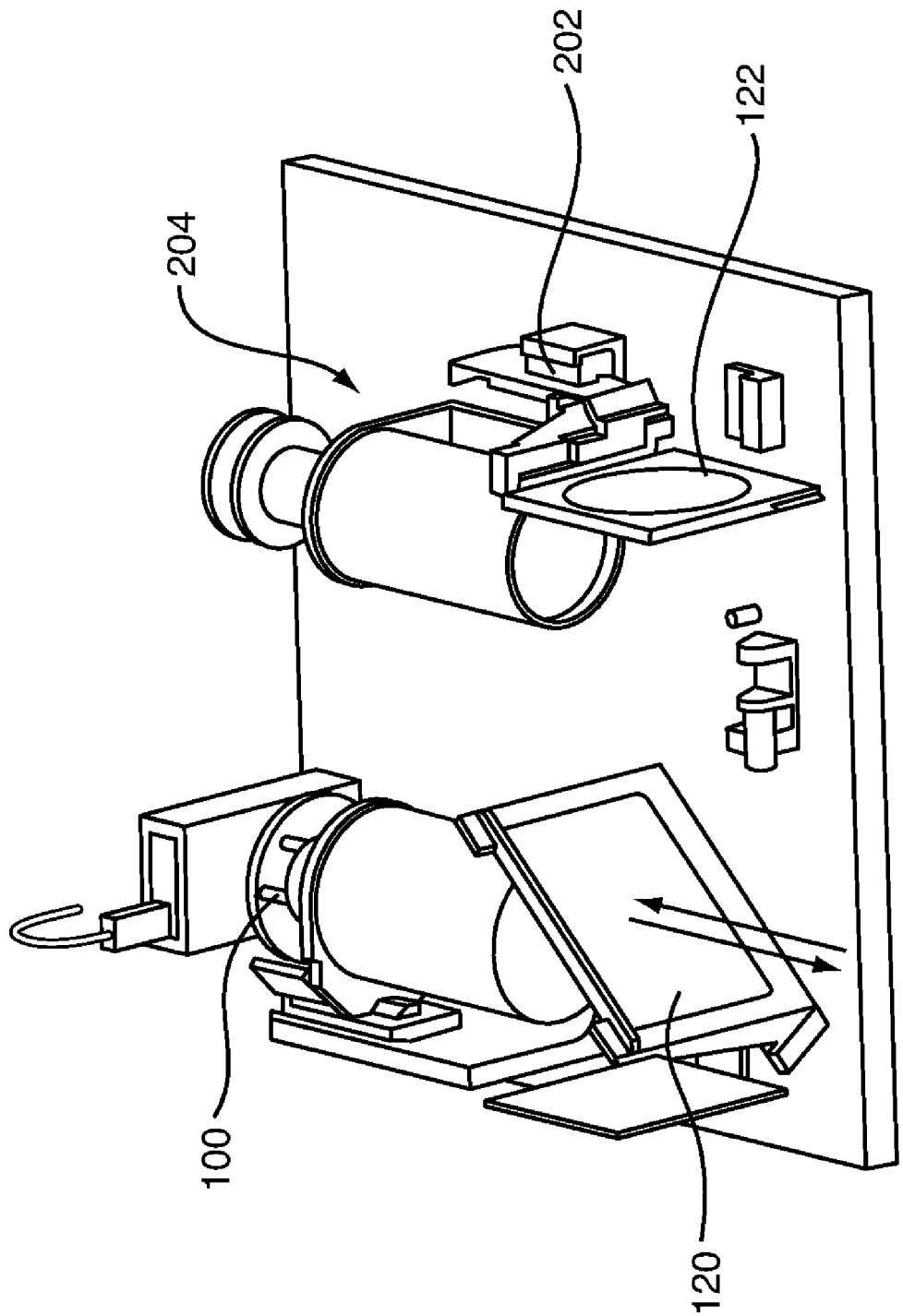
FIG. 5 is a pictorial view depicting a still further embodiment of the system employing a single illuminator for dual-axis illumination.

Referring now to FIG. 5, shown is a pictorial view depicting a still further embodiment of the system employing a single illuminator for dual-axis illumination. Instead of both an off-axis illuminator 104 and an on-axis illuminator 134 (shown in FIG. 3), a mirror 122 may be movably controlled by a mirror controller 202 to enable the use of a single dual-axis illuminator 204. The mirror controller 202 may allow the mirror 122 to change positions to reflect light from the dual-axis illuminator 204 as needed. For example, in one position the mirror 122 may reflect light from the dual-axis illuminator 204 to the beam splitter 120, and then the light is reflected to the target area as on-axis light. In another position, the mirror controller 202 may move the mirror 122 out of the way (as shown in FIG. 5) so that the dual-axis illuminator 204 emits off-axis light directly to the target area. Light reflected by the dual-axis illuminator 204, either on-axis or off-axis, may travel through the beam splitter 120 and be recorded by the camera 100. The use of a mirror controller 202 and mirror 122 able to change positions eliminates the need for a second illuminator.

Figure 6:
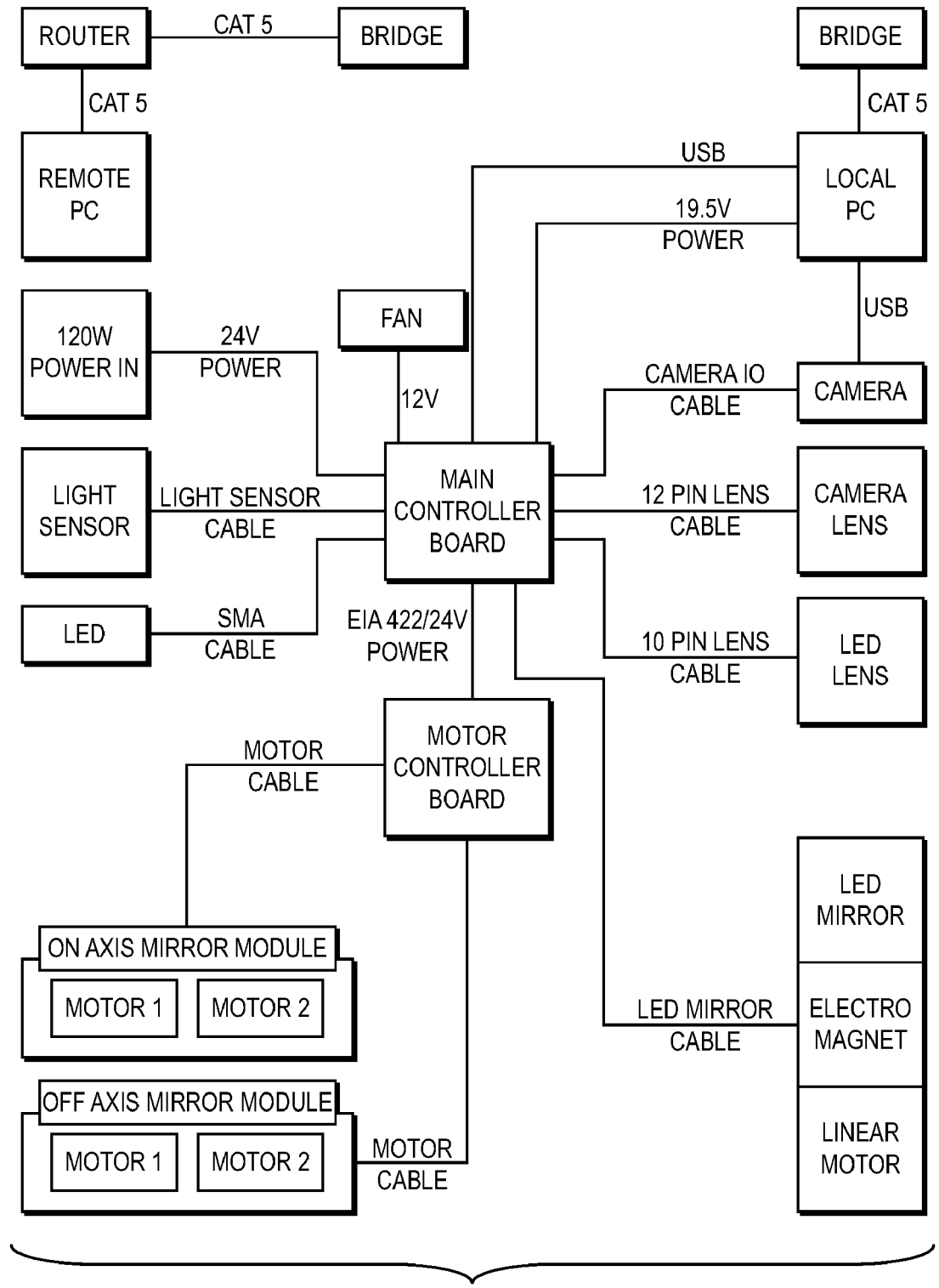
FIG. 6 is a block diagram describing the functional layout of the embodiment depicted in FIG. 5.

Referring now to FIG. 6, shown is a block diagram describing the functional layout of the embodiment depicted in FIG. 5. The main controller board functions to direct the capabilities of each of the components of the system. The main controller board may be controlled locally by a Local PC. A Remote PC may permit an operator of the system to control the Local PC from another location. In this way, the detection equipment may be installed inconspicuously near a stage or presentation area facing the audience, but a system operator may be in another room or at a remote location controlling interrogation for pirate cameras. For example, although not limited thereto, a system operator may even be in the audience and control the system by way of a wireless handheld computer device. This would allow the system operator to initiate an interrogation, identify a pirate camera, zoom and pan the camera to acquire forensic image information, as well as other functions.

Figure 7:
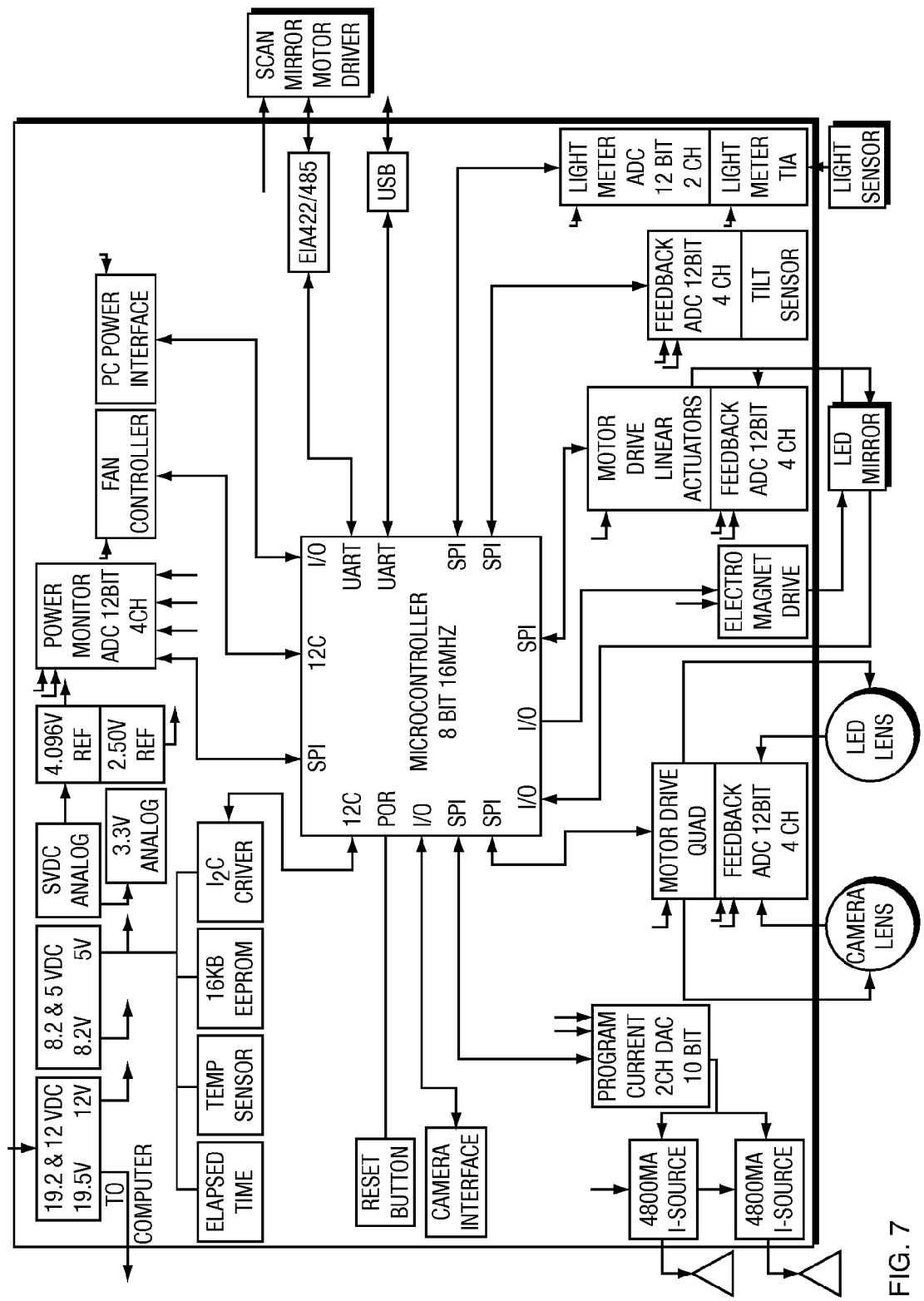
FIG. 7 is an electrical schematic diagram of one embodiment of the main controller board.

Referring now to FIG. 7, shown is an electrical schematic diagram of one embodiment of the main controller board.

Referring now to FIGS. 8A, 8B, 8C and 8D, shown are schematic diagrams depicting digital resampling. The field of view (FOV) is adjusted to maintain a constant foot print (e.g., number of seats, etc.) in a scan view of the target area regardless of the distance from the camera 100. This is possible because the zoom range of the optics and the cross-sectional area of the fixed mirror in the system can accommodate the full range of the target area from the far-field FOV 250 to the near-field FOV 254. Since detection of pirate cameras (or other optical devices) is based on source size in the focal plane of the camera, maintaining a constant footprint as a function of range is desirable in order to use the same detection and imaging algorithms for each row in the theater.

Figure 8A:
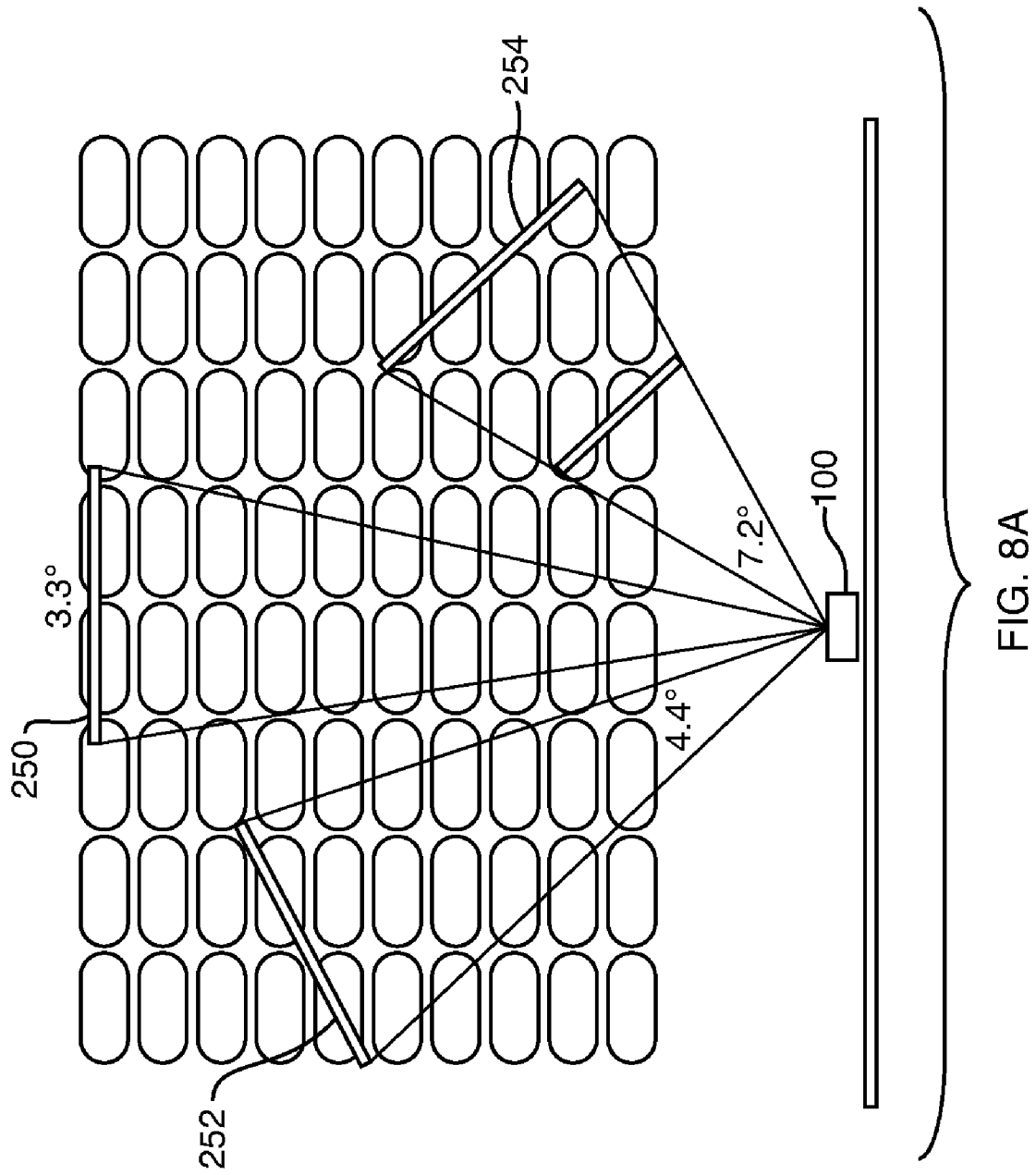
FIGS. 8A, 8B, 8C and 8D are schematic diagrams depicting digital resampling.
Figure 8B:
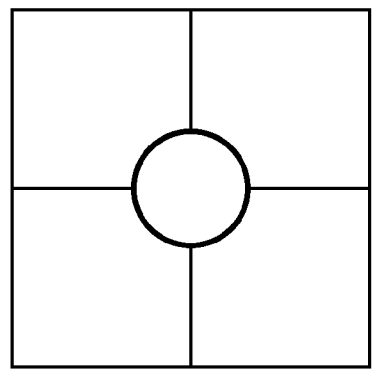
Figure 8C:
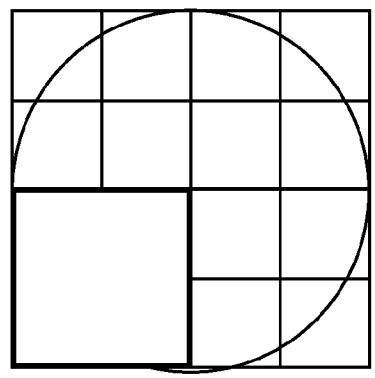
Figure 8D:
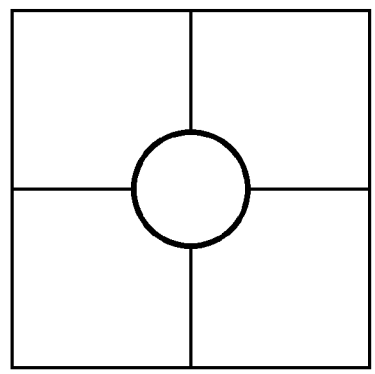

FIG. 8B shows reflection at mid field FOV 252 over 4 pixels, FIG. 8C shows reflection at mid-field FOV 252 enlarged by the ratio of mid-field/near-field (the signal average over mid-field/near-field pixels), and FIG. 8D shows the reflection as resampled. The zoom range of the optics and the cross-sectional area of the scanning mirrors in one instance may not be sufficient to maintain the source size of the image in the focal plane of the camera 100 in the near-field FOV 254 as shown in FIGS. 8A and 8B. As a result, the size of the image is increased by the ratio of the distance from the camera to the limit of the zoom optics to adjust the mid-field FOV 252 and the distance from the camera to the near-field FOV 254 as shown in FIG. 8C. Therefore, in one instance digital resampling may be employed to decrease resolution in the near-field to the same level as images taken in the rest of the target area. In one instance this is accomplished by averaging the signal intensity over a pixel count equal to the same ratio the image has been enlarged as shown FIG. 8C. The portion of the image that is outside the FOV of each near-field scan as shown in FIG. 8A is captured in previous and subsequent scans and added to the re-sized image as shown in FIG. 8D.

Figure 9:
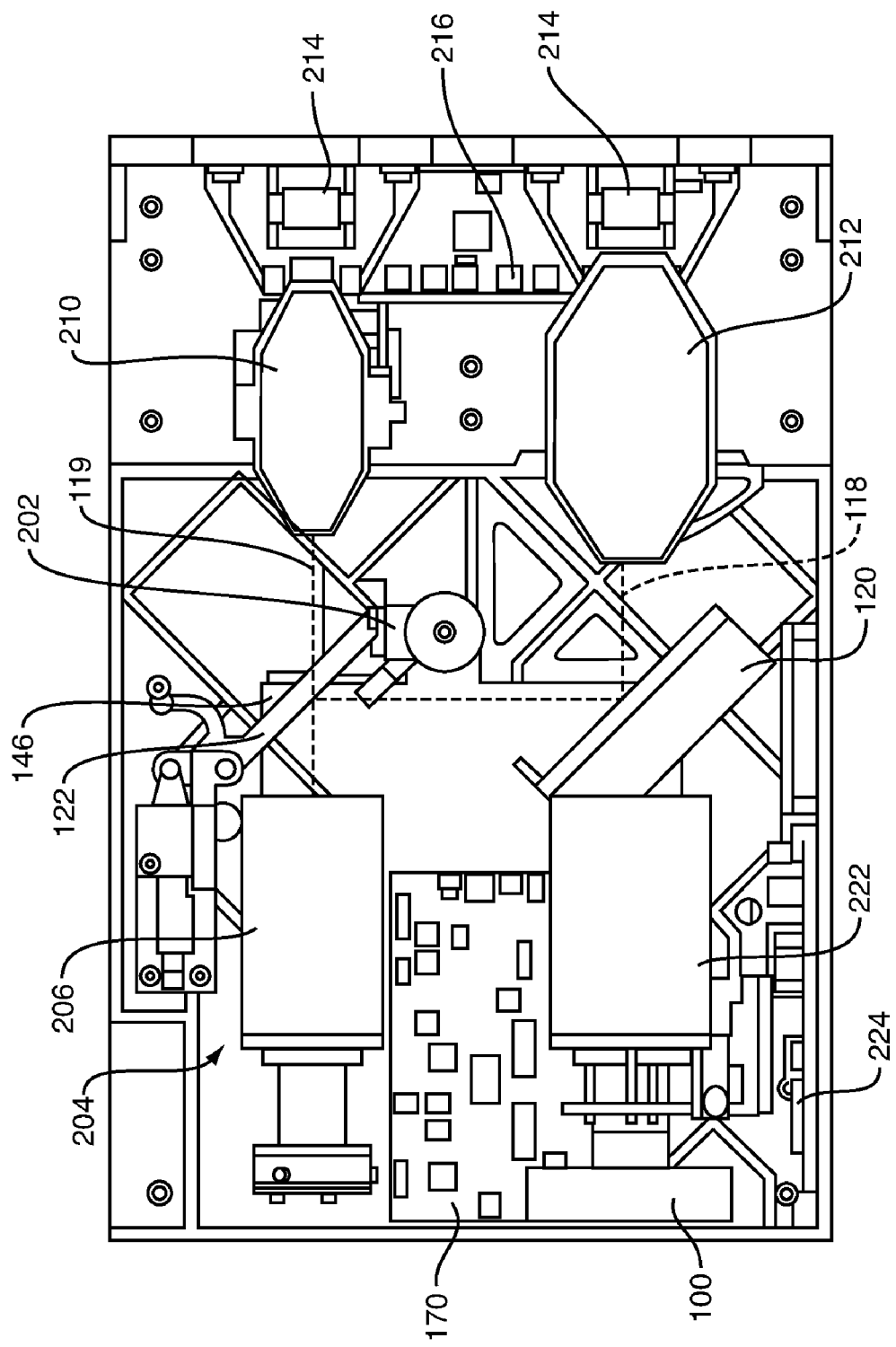
FIG. 9 is a schematic diagram depicting a still further embodiment of the system employing two scanning mirrors.

Referring now to FIG. 9, shown is a schematic diagram depicting a still further embodiment of the system employing two scanning mirrors. In this embodiment, a dual-axis illuminator 204, in this instance a highly directional LED, projects light through a zoom lens 206 positioned by the controller board 170 to a mirror 122 capable of being moved in multiple positions. When the mirror 122 is positioned in the down position by a mirror controller 202 (as shown), which may be an electro magnet, although not limited thereto, controlled by a signal from the controller board 170, the light is projected to a (dichroic) beam splitter 120 and is reflected as on-axis illumination light 118 to the on-axis scan mirror 212. The on-axis scan mirror 212 is controlled by a pan/tilt motor 214 and associated pan/tilt controller 216. The on-axis scan mirror 212 projects the light in a scanning motion left and right and up and down by the pan/tilt motor 214.

Any reflection of the illumination light is reflected by objects in the target area, captured by the on-axis scan mirror 212, and projected through the beam splitter 120 and camera lens 222 to the camera 100. Pixels illuminated by the reflection in the captured image are processed by the Local PC 146 and sent by the controller board 170 to a wireless network card 224 which sends the image to a Remote PC controlled by a system operator. The image seen by the system operator could be a retro-reflection off a pirate camera if the path of the reflection is on the axis of the camera, or background glint if the path of the reflection is omni-directional.

When the mirror 122 is placed in the up position by the mirror controller 202, such as by turning off the electro magnet, controlled by a signal from the controller board 170, the light is projected along the off-axis illumination light 119 path to the off-axis scan mirror 210 controlled by a pan/tilt motor 214 and associated pan/tilt controller 216. The off-axis scan mirror 210 projects the light in a scanning motion left and right and up and down by the pan/tilt motor 214. Any reflection from objects in the target area are then captured by the on-axis scan mirror 212 and projected through the beam splitter 120 and camera lens 222 to the camera 100. Pixels in the captured image illuminated by reflection of objects in the target area are imaged by the Local PC 146 and sent by the controller board 170 to the wireless network card 224 which sends the image to the Remote PC controlled by a system operator.

In this case, the image seen by the system operator can only be background glint (clutter) as the reflected light projected by off-axis-scan mirror 210 is off-axis from the camera 100.

A retro-reflection from a pirate camera illuminated by light projected from the off-axis scan mirror 210 cannot be reflected back to the camera 100. Accordingly, if the operator gets a reflection when light is projected from the on-axis scan mirror 212, but not when light is projected from the off-axis scan mirror 210 pointed to the same location, the reflection is a true retro-reflection off a pirate camera and not background glint. However, if the system operator gets a reflection when both the on-axis scan mirror 212 and the off-axis scan mirror 210 are pointed to the same location, the reflection is background glint (clutter).

Scanning mirrors may be employed for non-sequential scanning. This minimizes the perception of the LED flash to people in the target area. Typically, both an on-axis scan mirror 212 and a off-axis scan mirror 210 are synchronized so that they aim in the same direction. In this way, the on-axis scan mirror 212 may both disperse light from the dual-axis illuminator 204 and collect any reflections from objects in the target area. If a reflection is discovered, it may be the retro-reflection from an optical device. Off-axis light may then be used as a discriminator against false positives. The off-axis scan mirror 210 may disperse off-axis light from the dual-axis illuminator 204 and the on-axis scan mirror 212 may again collect any reflections from objects in the target area. If an off-axis light reflection is found at the same spot where an on-axis light reflection was found, it is not a true retro-reflection of an optical device, but is instead background clutter.

Figure 10:
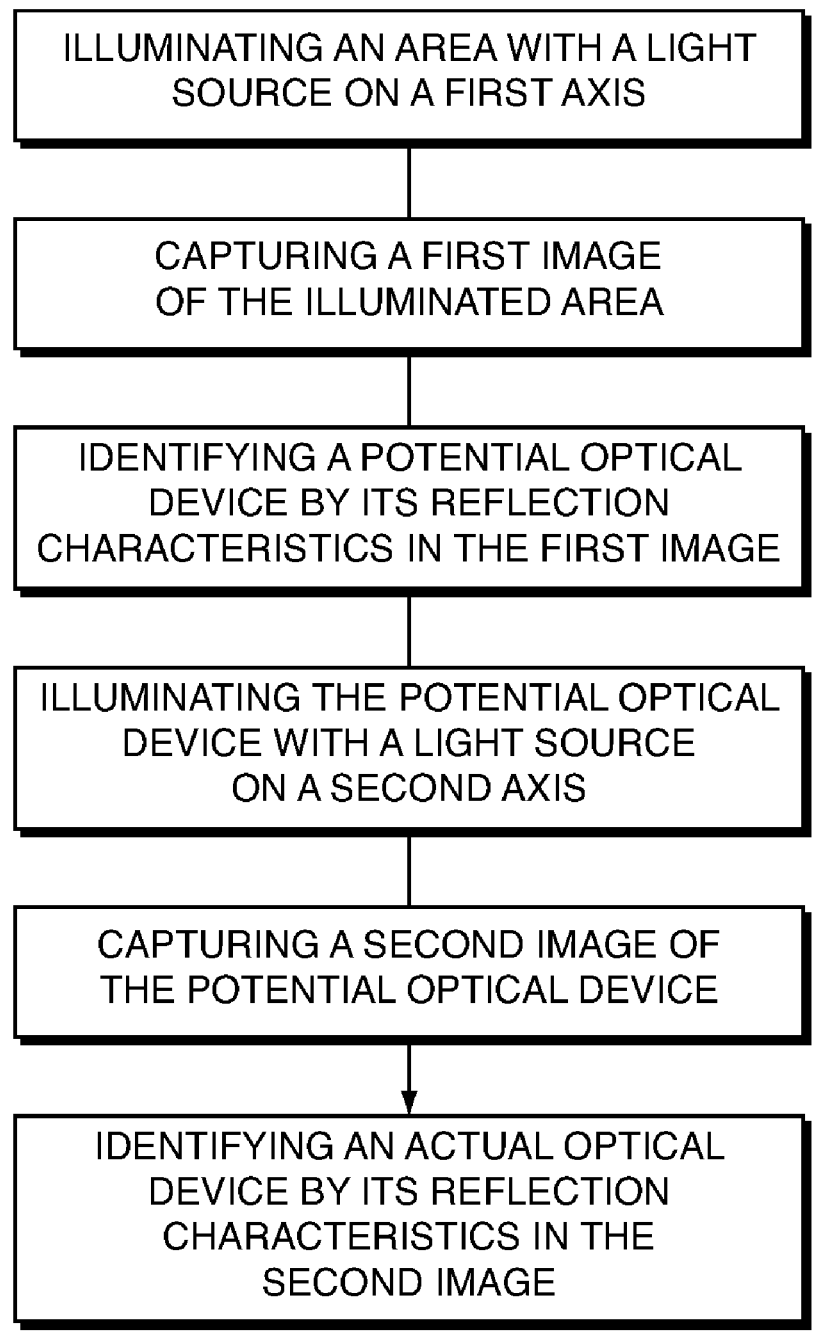
FIG. 10 is a block diagram describing one embodiment of the method of detecting optical devices.

Referring now to FIG. 10, shown is a block diagram describing one embodiment of the method of detecting optical devices. Using illumination sources on multiple axes, it is possible to reduce false positives. On-axis illumination may be used to first identify potential optical devices in the target area by their retro-reflection. Since optical devices can only exhibit retro-reflection on-axis, a subsequent, off-axis illumination source is then used. If the potential optical device also reflects light from the off-axis illumination source, it is not an optical device.

The following steps may be performed, although not limited thereto: illuminating an area with a light source on a first axis; capturing a first image of the illuminated area; identifying a potential optical device by its reflection characteristics in the first image; illuminating the potential optical device with a light source on a second axis; capturing a second image of the potential optical device; and identifying an actual optical device by its reflection characteristics in the second image.

Figure 11:
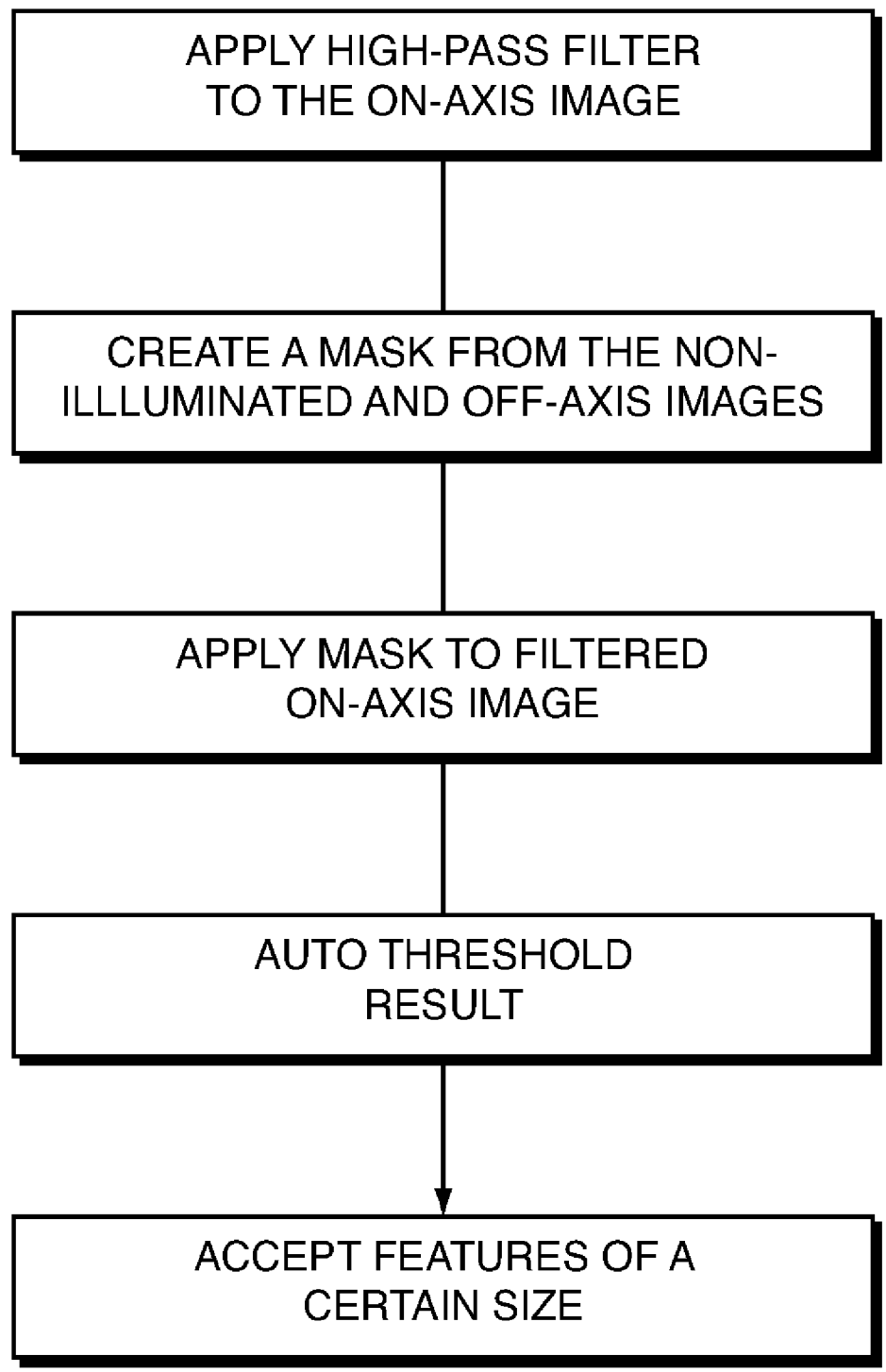
FIG. 11 is a block diagram describing one embodiment of the method of image processing.

Referring now to FIG. 11, shown is a block diagram describing one embodiment of the method of image processing. The Local PC may have computer readable media running software to employ the image processing algorithm, which identifies the retro-reflection of potential optical devices in the captured images, although not limited thereto. The algorithm may use characteristics of the non-illuminated and off-axis images to use for comparison with a captured image. True retro-reflections will exhibit distinguishable reflection characteristics, so the algorithm may identify reflections over a minimum size.

The thresholds in the algorithm are variable. Increasing the sensitivity may have the advantage of detecting of optical devices equipped with a circular polarizer or other countermeasures. A disadvantage may include the false positive detection of human eye retro-reflections. To mitigate this, the system may conduct multiple interrogations of the same location in order to track and compare detection points. A blue LED illumination source may also be used to reflect significantly less light off of the human eye.

The following steps may be performed, although not limited thereto: apply high-pass filter to the on-axis image; create a mask from the non-illuminated and off-axis images; apply mask to filtered on-axis image; auto threshold result; and accept features of a certain size.

In one embodiment of the image processing algorithm, although not limited thereto, a camera or cameras may first capture several images of the region of interest for manipulation and analysis. The images may include, although not limited thereto: 1) an on-axis image of the illuminated target area; 2) an off-axis image of the illuminated target area; and 3) a non-illuminated image of the target area (multiple images may be taken, discussed further below). Each of these initial images may first be resized if they are taken at a distance which is less than the minimum optical zoom distance. Resizing may be based on a "distance ratio" equal to the actual distance divided by the minimum optical zoom distance. Resizing serves to normalize any features in the images for all distances.

The acquired images may be used to identify retro-reflections of any optical devices found in the target area. A "working image" used for image processing may begin with a "maximum static background image," although not limited thereto, which may be created by computing the maximum pixel value at each pixel location of all of the non-illuminated images to obtain a single non illuminated image. Taking multiple non-illuminated images reduces the illumination variability due to ambient light such as the picture screen as well as light having different illumination frequencies such as running lights.

The working image may then be subtracted from the on-axis image, although not limited thereto, to create a new working image used in subsequent processing. This serves to minimize any static illumination sources and nullify inherent camera noise. In one instance, the working image may be convolved with a low pass filter, although not limited thereto. In one instance, a 3×3 Gaussian filter kernel may be used, although not limited thereto:

$$y[r, c] = \sum_{k=0}^{M-1} \sum_{j=0}^{M-1} h[k, j] \times [r-k, c-j]$$

A low pass filter removes high frequency detail (e.g., blurs) and reduces the optical differences caused by aliasing and a reduced depth of field.

Next, in one instance, although not limited thereto, the working image may be convolved with the high pass filter. In one instance, a 5×5 high pass filter kernel may be used, although not limited thereto. A high pass filter extracts high frequency detail (e.g., sharpens) by removing low frequencies and separating any retro-reflection signals from background signals.

An image mask may be created to accentuate all of the sources of reflection in the region of interest, although not limited thereto. The image mask may begin with a formation of a maximum image by computing the maximum pixel value at each pixel location of all of the non-illuminated images and the off-axis image to obtain a single image. From the maximum image all sources of reflection and illumination for a finite amount of time are gathered. The maximum image may then be blurred using a low pass filter to reduce the optical differences caused by aliasing and a reduced depth of field. The image mask may then be sharpened using a high pass filter to separate retro-reflection from the background. A maximum filter may then be applied to the image resulting from low pass filtering the maximum image. In one instance, the maximum filter may be a 5×5 window, although not limited thereto, which slides across the image 1 pixel at a time and sets the pixel value of every pixel in the 5×5 window to the maximum value found inside that same window. This increases the contrast and magnifies the size of any features. Sliding a window 1 pixel at a time samples the neighboring region around every individual pixel as opposed to a subset of pixels. In one instance, a histogram based binary threshold using 256 bins may be applied to the image resulting from the application of the maximal filter. A threshold may be applied to the image using the histogram based on a predetermined value, which may be determined empirically. Applying this threshold separates the foreground (signal) from the background (noise). The image resulting from the application of the threshold is referred to as an image mask.

The image mask may then be applied to the working image, although not limited thereto, by multiplying the two images together. This minimizes the false positive detection rate by masking out potential sources of reflection caused by screen illumination or off axis illumination.

In one embodiment, using clustering or pattern recognition techniques, the signal (foreground) is separated from the noise (background). In one instance, an ISODATA (Iterative Self-Organizing Data Analysis Techniques) algorithm may then be applied to the working image to find thresholds, although not limited thereto. (See, for example, Thresholding Using the ISODATA Clustering Algorithm, IEEE Transactions on Systems, Man and Cybernetics, Volume 10, Issue 11, Date: November 1980, Pages: 771-774, which is incorporated by reference herein is entirety.) This may be accomplished by using a 7×7 window, although not limited thereto:

$$\phi_k = \frac{(m_{f,k-1} + m_{b,k-1})}{2},$$

until $\phi_k = \phi_{k+1}$, where $f$ = foreground and $b$ = background

First, a starting threshold value is picked, which may be a midpoint pixel value for the neighboring area. The number of pixels above the threshold(foreground) and the number of pixels below the threshold(background) are counted in running subtotals. The new threshold may be equal to: ((foregroundTotal/foregroundCount)+(backgroundTotal/backgroundCount))/2. If new threshold is equal to the previous threshold, then the pixels within the window may use the new threshold, otherwise this process may be repeated. This serves to separate the foreground (signal) from the background (noise). It should be noted that these teachings are not limited only to the ISODATA algorithm but other clustering and pattern recognition algorithms are within the scope of these teachings. (See, for example, Handbook of Pattern Recognition and Image Processing, T. Y. Young and K. S. Fu, Chapter 2, pp. 33-57, 1986, ISBN 0-12-774560-2, which is incorporated by reference herein is entirety.)

Finally, in one embodiment, features found in the signal (foreground) that may be larger than the maximum retro reflection size may be excluded. In one instance, feature size discrimination may be performed on the image resulting from the clustering operation or the image resulting from the multiplication of the image mask with the working image (both of which are referred to as the resulting working image, or simply the working image) using a window of predetermined size. In one exemplary embodiment, an 11×11 window is utilized, although not limited thereto. The feature size discrimination determines if a blob, or group of pixels such as 2 more, is inside the window. If the blob and all of its edges remain inside the window area, it passes the size constraints; however, if the blob extends out past the border of the window, the blob fails the size constraints. This process helps to exclude features found in the foreground which are larger than a maximum retro-reflection size.

Figure 12:
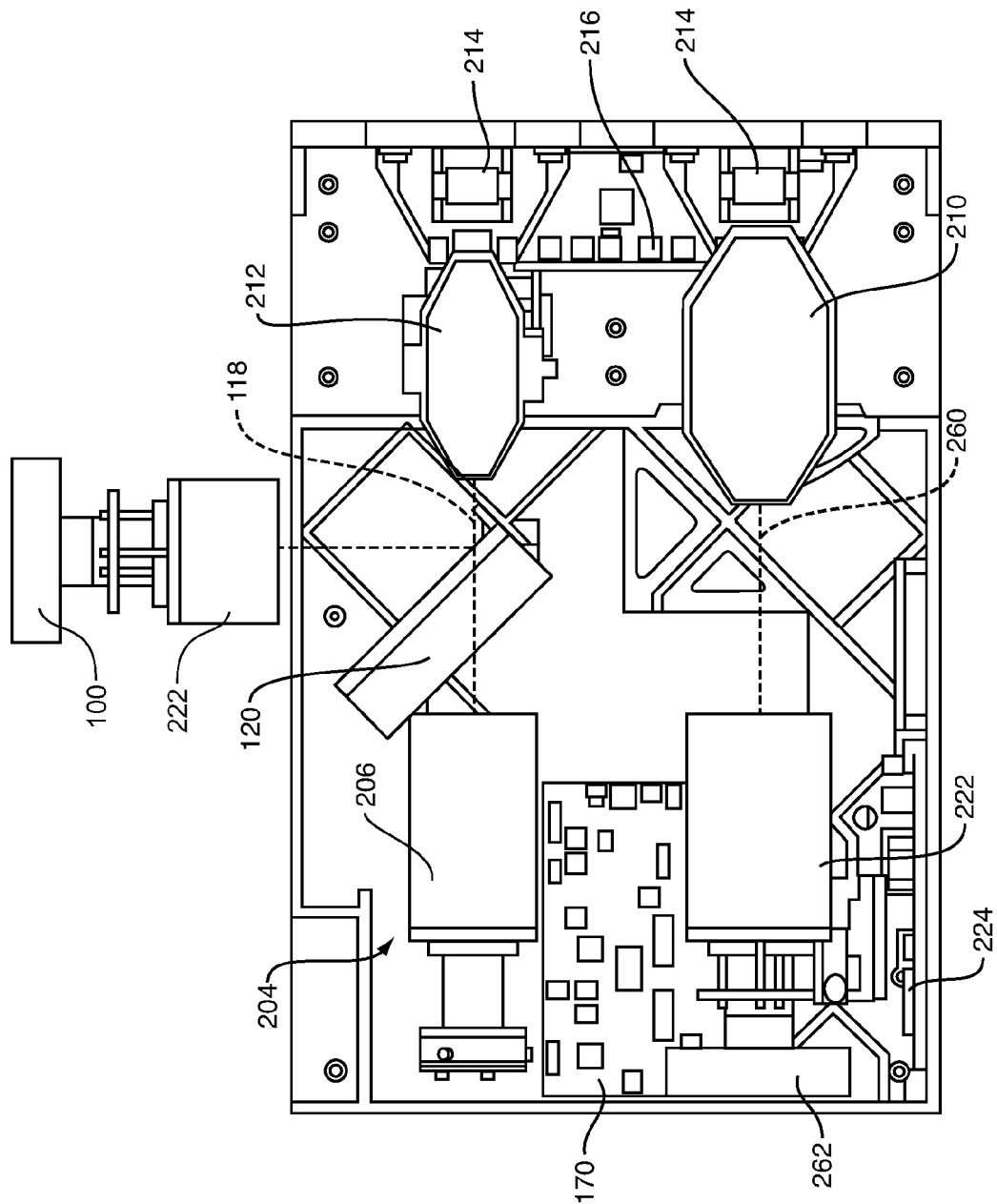
FIG. 12 is a schematic diagram depicting a still further embodiment of the system employing a second off-axis camera.

Referring now to FIG. 12, shown is a schematic diagram depicting a still further embodiment of the system employing a second off-axis camera 262. This embodiment, although not limited thereto, employs two cameras and a single dual-axis illuminator 204. This embodiment allows for the detection of optical devices by taking two images of an illuminated target area at the same time. The dual-axis illuminator 204 projects light along the on-axis illumination light path 118 through the beam splitter 120 and to the on-axis scan mirror 212 for dispersal to the target area. Any reflected light from the target area is captured by the on-axis scan mirror 212 and sent back to the beam splitter 120 where it is now reflected and sent to the camera 100.

At the same time, any reflected light is captured by the off-axis scan mirror 210 and travels along the off-axis reflected light path 260 to the off-axis camera 262. With a single illumination of the target area, any optical devices can be identified since retro-reflection from the dual-axis illuminator 204 will only be captured by the camera 100. If the off-axis camera 262 also captures a reflection when both the on-axis scan mirror 212 and off-axis scan mirror 210 are directed at the same illuminated area, then it is not a retro-reflection and must instead be background glint.

Figure 13:
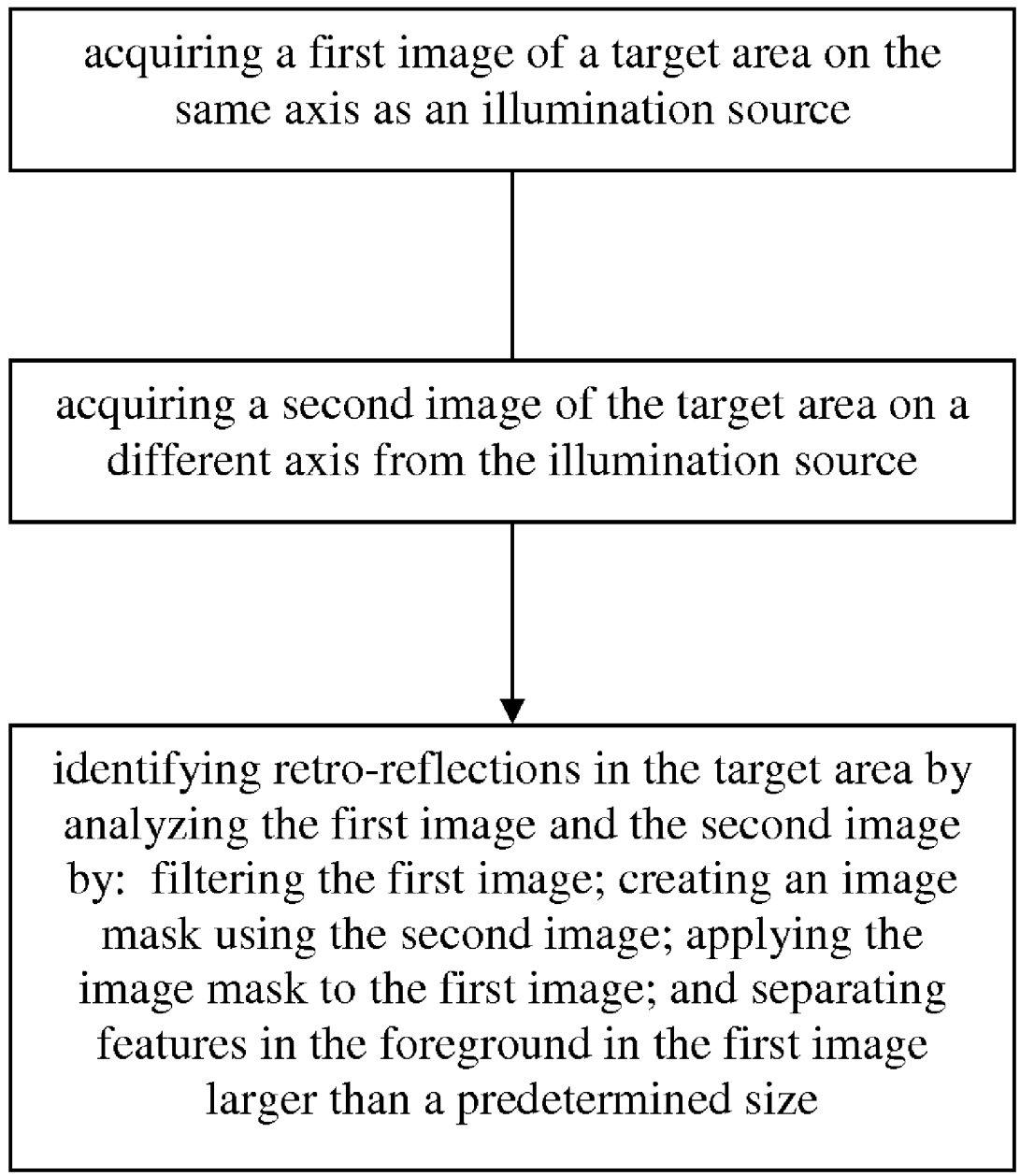
FIG. 13 is a flowchart describing another embodiment of the method of detecting optical devices.

Referring not to FIG. 13, shown is a flowchart describing another embodiment of the method of detecting optical devices. The following steps may be performed, although not limited thereto: acquiring a first image of a target area on the same axis as an illumination source; acquiring a second image of the target area on a different axis from the illumination source; and identifying retro-reflections in the target area by analyzing the first image and the second image by: filtering the first image; creating an image mask using the second image; applying the image mask to the first image; and separating features in the foreground in the first image larger than a predetermined size.

The term "illuminator" used herein refers to any source of electro-magnetic radiation and it is not limited to LEDs, infrared light, or any other form of light. As discussed above, electromagnetic radiation of different wavelengths may be preferable in certain circumstances and an illuminator that creates a retro-reflection in optical devices at any wavelength may be used with the system.

Similarly, the term "camera" used herein refers to any image acquisition system. A camera may comprise optical, electronic, and/or mechanical components. As discussed above, it only requirement is that it be able to acquire an image of the target area which may be used for detecting optical devices.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

We claim:

1. A system for detecting an optical device, comprising:
    an illumination system for illuminating a target area;
    an image acquisition system comprising a camera for capturing a first short-exposure image of the target area from a first position and for capturing a second long-exposure image of the target area from the first position; and
    a processor and computer readable media having computer code for causing the processor to identify retro-reflections in the target area by analyzing the first short-exposure image and the second long-exposure image,
    wherein the computer code for causing the processor to identify retro-reflections in the target area by analyzing the first short-exposure image and the second long-exposure image comprises:
        identifying a local maximum having a well-defined peak of bright pixels surrounded by darker pixels in the first short-exposure image;
        determining if the identified local maximum has a size that is less than a threshold size in the first short-exposure image; and
        upon determining that the identified local maximum has a size that is less than a threshold size in the first short-exposure image, selecting the identified local maximum as a candidate local maximum in the first short-exposure image;
        identifying a local maximum having a well-defined peak of bright pixels surrounded by darker pixels in the second long-exposure image;
        determining a size of the identified local maximum in the second long-exposure image;
        determining if the identified local maximum has a size that is less than a threshold size in the second long-exposure image; and
        upon determining that the identified local maximum has a size that is less than a threshold size in the second long-exposure image, selecting the identified local maximum as a candidate local maximum in the second long-exposure image;
        determining if the candidate local maximum in the first short-exposure image and the candidate local maximum in the second long-exposure image are reflections from the same optical device by comparing the first short-exposure image and the second long-exposure image; and
        upon determining that the candidate local maximum in the first short-exposure image and the candidate local maximum in the second long-exposure image are reflections from the same optical device, indicating that the optical device has been detected.

2. The system of claim 1 further comprising a beam splitter wherein:
    the illumination system comprises on-axis illuminator for illuminating a target area on the same axis as the camera and an off-axis illuminator for illuminating a target area on a different axis from the camera.

3. The system of claim 1 further comprising a beam splitter and a moveable mirror wherein:
    the illumination system comprises a dual-axis illuminator; wherein when the moveable mirror is in a first position the dual-axis illuminator illuminates the target area on the same axis as the camera and when the moveable mirror is in a second position the dual-axis illuminator illuminates the target area on a different axis from the camera.

4. The system of claim 1 further comprising a beam splitter wherein:
    the illumination system comprises an illuminator; and
    the image acquisition system comprises an on-axis camera for capturing an image of the target area on the same axis as the illuminator and an off-axis camera for capturing an image of the target area on a different axis from the illuminator.

5. The system of claim 1 wherein the illumination system comprises an LED light.

6. The system of claim 5 wherein the LED light pulses in periods of less than approximately 5 milliseconds.

7. The system of claim 5 further comprising a steering mirror that directs the LED light.

8. The system of claim 1 further comprising a filter adjacent to the image acquisition system.

9. The system of claim 1 further comprising a forensic image acquisition system for acquiring a forensic image of a person when an optical device is detected.

10. The system of claim 1 further comprising a user alert system for alerting a user when an optical device is detected.

11. The system of claim 1 wherein the processor and computer readable media are remote from the illumination system.

12. The system of claim 11 wherein the processor and computer readable media communicate with more than one image acquisition system.

13. A method of detecting an optical device, comprising the steps of:
    (a) acquiring a first short-exposure image of a target area from a first position by using a camera;
    (b) acquiring a second long-exposure image of the target area from the first position by using a camera; and
    (c) identifying retro-reflections in the target area by analyzing the first short-exposure image and the second long-exposure image by using a processor by:
        identifying a local maximum having a well-defined peak of bright pixels surrounded by darker pixels in the first short-exposure image;
        determining if the identified local maximum has a size that is less than a threshold size in the first short-exposure image; and
        upon determining that the identified local maximum has a size that is less than a threshold size in the first short-exposure image, selecting the identified local maximum as a candidate local maximum in the first short-exposure image;
        identifying a local maximum having a well-defined peak of bright pixels surrounded by darker pixels in the second long-exposure image;
        determining a size of the identified local maximum in the second long-exposure image;
        determining if the identified local maximum has a size that is less than a threshold size in the second long-exposure image; and
        upon determining that the identified local maximum has a size that is less than a threshold size in the second long-exposure image, selecting the identified local maximum as a candidate local maximum in the second long-exposure image;
        determining if the candidate local maximum in the first short-exposure image and the candidate local maximum in the second long-exposure image are reflections from the same optical device by comparing the first short-exposure image and the second long-exposure image; and upon determining that the candidate local maximum in the first short-exposure image and the candidate local maximum in the second long-exposure image are reflections from the same optical device, indicating that the optical device has been detected.

14. The method of claim 13 wherein the target area is a movie theater.

15. A system for detecting an optical device, comprising: means for illuminating a target area with illumination; means for capturing a first short-exposure image of the target area from a first position; means for capturing a second long-exposure image of the target area from the first position; a processor and computer readable media having computer code for causing a processor to identify retro-reflections in the target area by:
- identifying a local maximum having a well-defined peak of bright pixels surrounded by darker pixels in the first short-exposure image;
- determining if the identified local maximum has a size that is less than a threshold size in the first short-exposure image; and
- upon determining that the identified local maximum has a size that is less than a threshold size in the first short-exposure image, selecting the identified local maximum as a candidate local maximum in the first short-exposure image;
- identifying a local maximum having a well-defined peak of bright pixels surrounded by darker pixels in the second long-exposure image;
- determining a size of the identified local maximum in the second long-exposure image;
- determining if the identified local maximum has a size that is less than a threshold size in the second long-exposure image; and
- upon determining that the identified local maximum has a size that is less than a threshold size in the second long-exposure image, selecting the identified local maximum as a candidate local maximum in the second long-exposure image;
- determining if the candidate local maximum in the first short-exposure image and the candidate local maximum in the second long-exposure image are reflections from the same optical device by comparing the first short-exposure image and the second long-exposure image; and
- upon determining that the candidate local maximum in the first short-exposure image and the candidate local maximum in the second long-exposure image are reflections from the same optical device, indicating that the optical device has been detected.

16. The system of claim 15, wherein the first short-exposure image has an exposure time of approximately 80 milliseconds, and the second long-exposure image has an exposure time of approximately 750 milliseconds.

* * * * *